(12) United States Patent
Cato et al.

(10) Patent No.: US 6,813,669 B1
(45) Date of Patent: Nov. 2, 2004

(54) AGENT PROVIDED BY USB DEVICE FOR EXECUTING USB DEVICE DEPENDENT PROGRAM IN USB HOST

(75) Inventors: Robert Thomas Cato, Raleigh, NC (US); Phuc Ky Do, Cary, NC (US); Eugene Michael Maximilien, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/512,200

(22) Filed: Feb. 24, 2000

(51) Int. Cl.⁷ .......... G06F 13/00; G06F 13/12; G06F 3/00; G06F 13/36
(52) U.S. Cl. .......... 710/302; 710/63; 710/52; 710/4; 710/8; 710/314; 710/315
(58) Field of Search .......... 710/302, 63, 52, 710/4, 8, 315, 314

(56) References Cited

U.S. PATENT DOCUMENTS

| | | | |
|---|---|---|---|
| 5,465,357 A | 11/1995 | Bealkowski et al. | 395/700 |
| 5,546,585 A | 8/1996 | Soga | 395/700 |
| 5,689,726 A | 11/1997 | Lin | 395/830 |
| 5,854,905 A | 12/1998 | Garney | 395/284 |
| 5,935,224 A * | 8/1999 | Svancarek et al. | 710/63 |
| 5,958,027 A * | 9/1999 | Gulik | 710/52 |
| 5,987,530 A * | 11/1999 | Thomson | 710/4 |
| 6,009,480 A * | 12/1999 | Pleso | 710/8 |
| 6,131,134 A * | 10/2000 | Huang et al. | 710/302 |

FOREIGN PATENT DOCUMENTS

| | | | | |
|---|---|---|---|---|
| JP | 2000-250768 | 2/2000 | | G06F/9/46 |
| JP | 2000-353079 | 3/2000 | | G06F/9/06 |
| WO | 02/01267 | 1/2003 | | G06F/15/00 |

* cited by examiner

*Primary Examiner*—Xuan M. Thai
*Assistant Examiner*—Tim Vo
(74) *Attorney, Agent, or Firm*—J. Bruce Schelkopf

(57) ABSTRACT

When a universal serial bus (USB) device is plugged in, the USB device enumerates as a "mass storage device" (or any device capable of input) even though the device is not actually a "mass storage device." A USB device agent would be included in a storage device on the USB device in the form of an executable file. After the device enumerates the first time as a "mass storage device," the user selects the "mass storage device" and executes the appropriate executable file containing the agent. The agent would then install itself on the host hard file and thereafter it could function with any other compatible USB device. The agent could then command compatible devices to re-enumerate as what they actually are. The agent could also enable enhanced host/device interactions and enhanced device functionality and diagnostics.

17 Claims, 2 Drawing Sheets

AGENT PROVIDED BY USB DEVICE FOR EXECUTING USB DEVICE DEPENDENT PROGRAM IN USB HOST

CROSS-REFERENCE TO RELATED APPLICATIONS

The present Application is related to U.S. patent application Ser. No. 09/426,855, entitled "MULTIMODE NON-STANDARD UNIVERSAL SERIAL BUS COMPUTER INPUT DEVICE," which is hereby incorporated by reference herein.

TECHNICAL FIELD

The present invention relates in general to data processing systems, and in particular, to data processing systems adaptable for coupling to USB devices.

BACKGROUND INFORMATION

Within the past few years, an association of private manufacturers has created a universal standard and method for linking many peripherals to a personal computer simultaneously. This standard is referred to as the Universal Serial Bus (USB). The USB is a communications architecture or "bus" that provides a personal computer with the ability to interconnect to a wide variety of devices or peripherals via a relatively simple cable. The cabled peripherals share USB bandwidth through a host-scheduled, boolean based protocol. The bus allows peripherals to be attached, configured, used, and detached while the host and other peripherals are in operation. The USB allows for the replacement of peripherals that have previously been attached to special-purpose interfaces and accessed by direct hardware methods.

Input/output (I/O) devices frequently are shipped with diskettes that contain installation or setup data, diagnostic programs, drivers, a tutorial, a "readme" file, and other information. Such diskettes are often misplaced or unavailable when needed.

With respect to USB devices, the present invention eliminates such diskettes and adds functionality.

SUMMARY OF THE INVENTION

The present invention addresses the foregoing need. After power up, a USB device enumerates as a "mass storage device" (which typically is a hard file, CD ROM, or floppy drive), even though the device actually is not a "mass storage device." An operating system (OS) independent (e.g., written in Java) USB device agent would be included in the ROM or EPROM of the USB device in the form of an executable file (.exe). After the device enumerates the first time as a "mass storage device," the user would be required to go to Windows Explorer or a DOS window (or equivalent), select the "mass storage device" (denoted by a letter such as j: or k:), and execute the appropriate .exe file containing the agent. The agent would then install itself on the host hard file and thereafter it could function with any other compatible USB device. The agent software would only need to be loaded once.

The device agent would detect when a compatible USB device is enumerated and would then query the device for device dependent information. This information would include what kind of information and software is available to support the device and where the information can be obtained.

Alternatively, the USB device could enumerate as any device capable of inputting data to a host and recognizable by an operating system without a need for an additional driver.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
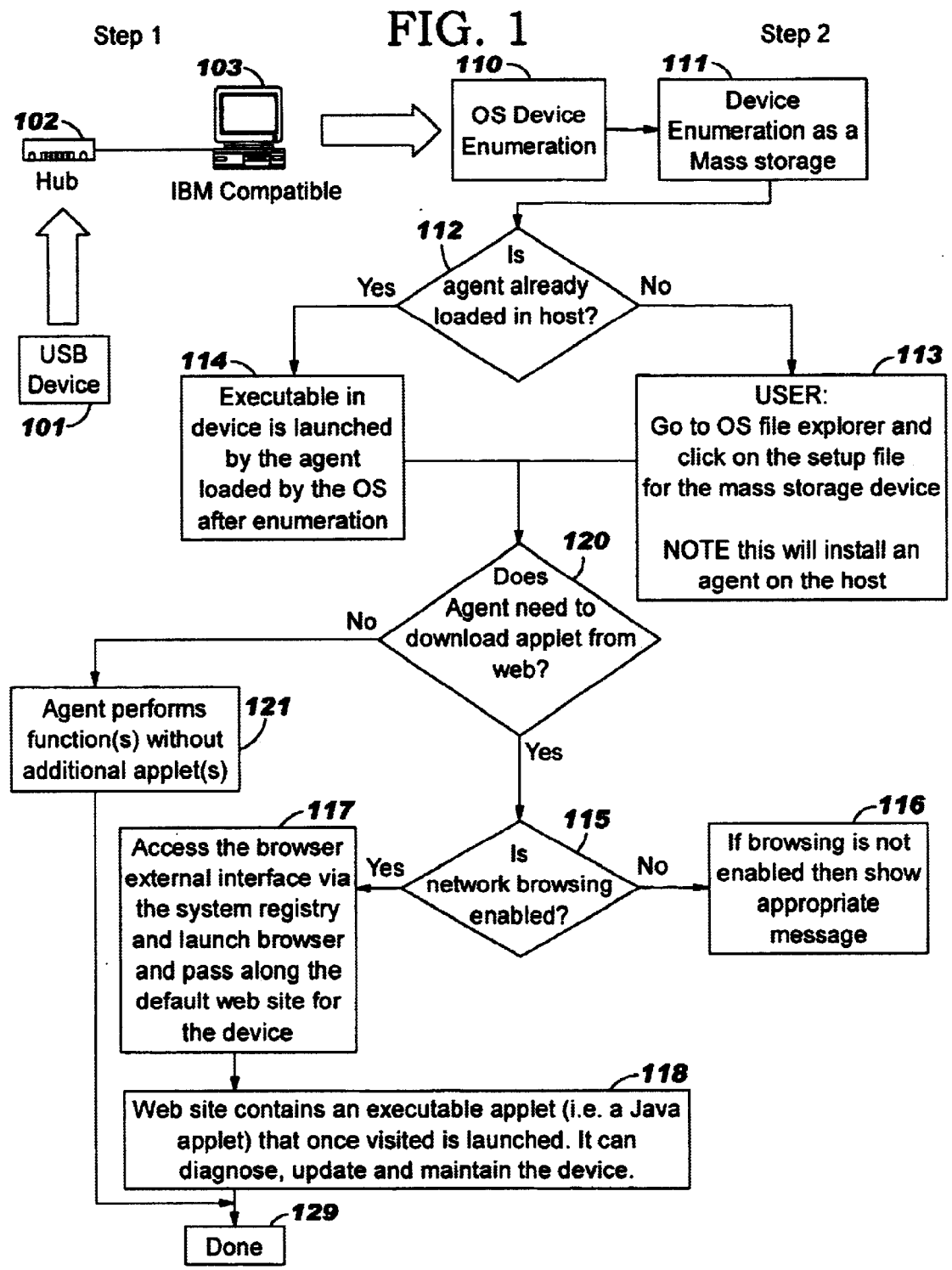
FIG. 1 illustrates a flow diagram in accordance with the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring to FIG. 1, USB devices 101 typically have some type of storage device such as a read only memory (ROM) or a flash EPROM (electronically programmable read only memory). In one embodiment of the present invention, such a memory device will have sufficient memory capacity to store a Java based software program, which program could then take advantage of the Java Virtual Machine (JVM) that is included with Windows and most other operating systems, and Netscape Navigator. Unused EPROM space could be used to store one or more programs that could be used by the customer in association with the particular I/O device. The present disclosure describes how one such program, an "agent" is uploaded from the USB device 101 into the host 103. The agent would then work with the host 103, which would provide the display, keyboard, mouse, etc., necessary for human interaction with other USB device specific programs. The device agent could store USB device specific information and/or software on the host's hard file and also (optionally) create an icon on the host's display desktop. The user could reuse the enhanced functions at a later time.

The basic idea would be that once the OS independent Java agent is loaded into the host 103, it would use a customized class loader that would load the interaction (diagnostics, etc.) classes from the device 101 (which appears as a USB storage device). These class files (Java executable byte codes) would describe to the agent how to interact with the USB device 101. After interacting with the USB device 101, the agent would then command the device to re-enumerate for normal use. The agent would subsequently detect when compatible USB devices enumerated as mass storage devices and then (as appropriate) command them to re-enumerate as what they truly are. Such an agent would use the USB Java API (application programming interface) plus some native code that gives Java access to the USB device 101.

As disclosed in the cross-referenced U.S. patent application Ser. No. 09/426,855 a USB device when connected to a host informs the host what it is. The USB device can pretend it is something else, i.e., it can enumerate as a device other than what it is, as long as the device knows how it is supposed to behave.

Referring again to FIG. 1, a USB device 101 is connected to a HUB 102 coupled to a host computer 103. The USB device 101 enumerates as a mass storage device in step 111. Note, device 101 could enumerate as any device capable of inputting data and recognizable by an operating system without the need for an additional driver. Hereinafter, such a device may also be referred to as an "enumerated input device."

In step 112, a determination is made whether there is an agent program already loaded in the host computer 103. If yes, then in step 114, an executable program in the device 101 is launched by the agent loaded by the operating system after enumeration. However, if an agent is not already loaded in the host 103, then the user will be required in step 113 to proceed to the operating system file explorer and click on the setup file for the mass storage device created by the enumeration (DOS commands could also be used), or will be required to download an agent from the Internet for storage in the host computer 103. Step 120 determines if the agent needs to download an applet from the Internet in order to provide a desired function. If it does, step 115 is executed. If not, then in step 121, the process performs whatever functions it can without additional applets. Afterwards, the agent is Done in step 129.

In step 115, a determination is made whether network browsing has been enabled. There are two possible ways of determining whether network browsing has been enabled. One way is for the system to walk the system registry to see if there exists an entry for the browser (i.e., Microsoft Internet Explorer (IE) or Netscape Navigator), and then attempt to launch the browser. If it fails or an entry in the registry cannot be found, then network browsing must be disabled. Note, since Microsoft bundles IE with their operating system, the browser is always present. The second way is that in most operating systems and system middleware (i.e, Java), there is the notion that components which can expose interfaces for "outsiders" to programably and dynamically query or communicate. For instance, Microsoft Internet Explorer exposes COM and COM+ interfaces that allow programmers to embed Internet Explorer's functionality into their programs and/or launch Internet Explorer directly (via the Microsoft Win32/COM API). This interface also exposes properties that allow a program to find out if network browsing is enabled. Note, Lotus Notes, Microsoft Money 99 and 2000 all are examples of applications using the IE COM interfaces. Other operating systems have similar approaches though they use other object communication middleware such as CORBA, JavaBeans (HotJava Network Browser).

If browsing has not been enabled, then in step 116, an appropriate message will be shown to the user that such browsing is not enabled. However, if network browsing is enabled, then in step 117 the process will access the browser external interface via the system registry and launch the browser and pass along the default website for the device. This can be accomplished in a manner similarly as described above in the second option for determining if network browsing is enabled. Part of the exposed functionality is interfaces for dynamically commanding the browser to go to a particular site. The website will contain an executable applet that once visited is launched, and it can then diagnose, update, maintain, or enhance the functionality of the device 101.

Figure 2:
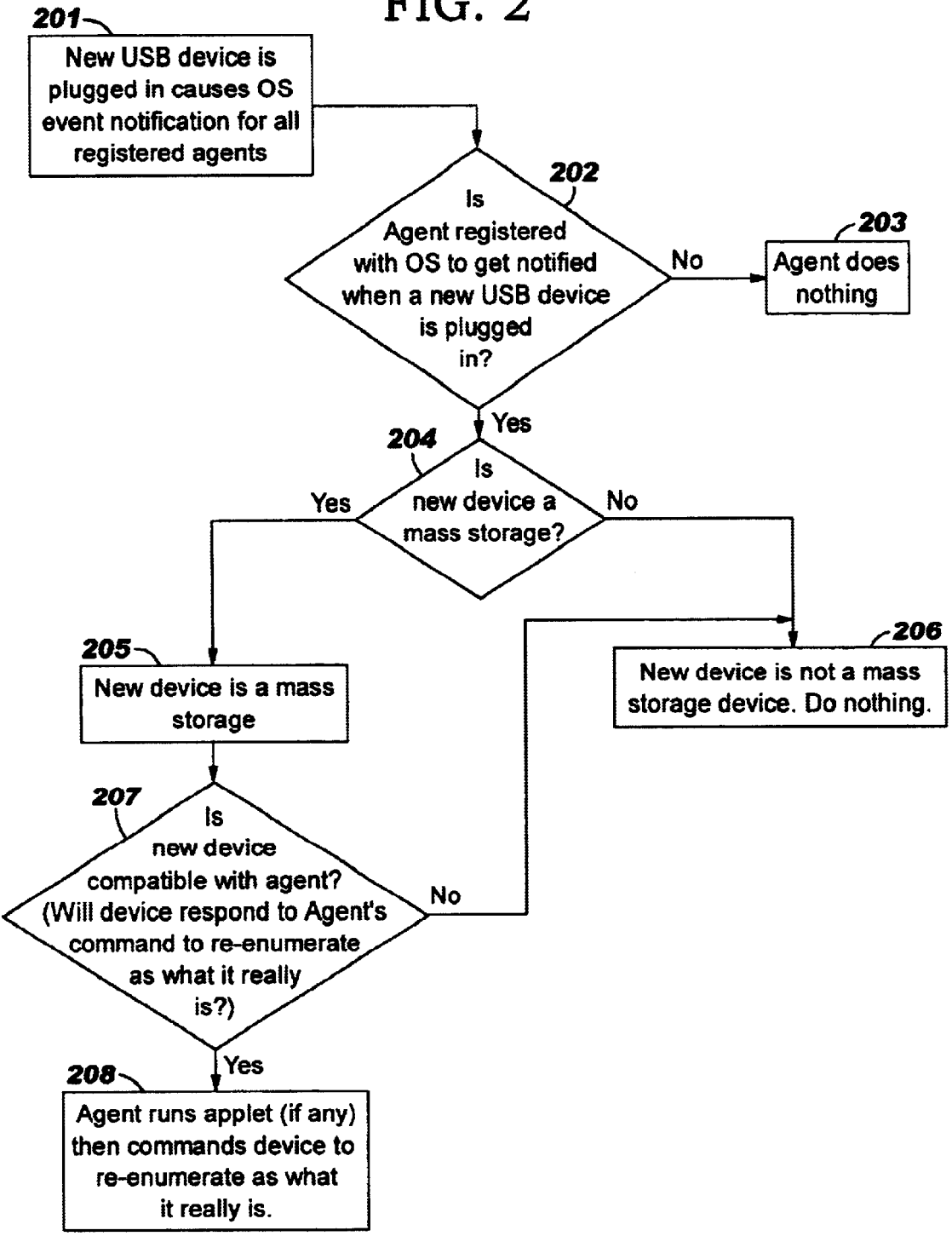
FIG. 2 illustrates a flow diagram of an agent sensing when other compatible USB devices enumerate as mass storage devices.

In addition to providing the functions described below, the agent program would sense when compatible USB devices enumerate as mass storage devices. The agent would then send a command to the recently enumerated compatible "mass storage device." The agent's command would cause the USB device to disconnect from the USB and re-enumerate as what it really is. This is illustrated in FIG. 2 where in step 201 a new USB device is plugged in and causes an operating system event notification for all registered agents. The process of a USB device disconnecting, reconnecting and re-enumerating in a different mode is described in the cross-referenced U.S. patent application Ser. No. 09/426,855. Thereafter, in step 202, a determination is made whether the agent is registered with the operating system to get notified when a new USB device is plugged in. If not, then in step 203, the agent does nothing. However, if the answer is affirmative in step 202, the process proceeds to step 204. In step 204, a determination is made whether the new device is a "mass storage device." Again, alternatively, any device capable of input could suffice. The host or an agent in the host can determine the characteristics of a newly enumerated device by looking at the descriptors that the device provides the host during enumeration. The standard process of a USB device enumerating with a USB is common knowledge among programmers familiar with standard USB host systems. If the new device enumerates as a "mass storage device," then a determination is made in step 207 if the new device is compatible with the agent. In other words, whether the new device will respond to the agent's command to re-enumerate as what it really is. If not, the process proceeds to step 206 where the new device is designated as not a mass storage device, and then nothing is performed in the process. If in step 207 the new device is compatible with the agent, then the process proceeds to step 208 where the agent runs an applet (if any) and then commands the device to re-enumerate as what it really is.

To restate part of the above, the device agent would detect when a compatible USB device is enumerated and would then query the device for device dependent information. This information would include what kind of information and software is available to support the device and where the information can be obtained. In addition to providing the information itself, the device could provide a web URL that would provide more information.

Although the present invention and its advantages have been described in detail, it should be understood that various changes, substitutions and alterations can be made herein without departing from the spirit and scope of the invention as defined by the appended claims.

What is claimed is:

1. In a data processing system, a method comprising the steps of:

coupling a peripheral device to a processor;

enumerating the peripheral device as a first enumerated input device, wherein the peripheral device may not actually be the input device represented by the enumeration;

selecting the first enumerated input device;

executing an executable file contained within the first enumerated input device, which results in a loading of an agent in memory of the data processing system coupled to the processor; and re-enumeration of the peripheral device by the agent so that the peripheral device enumerates as itself.

2. The method as recited in claim 1, wherein the peripheral device is a universal serial bus ("USB") device.

3. The method as recited in claim 1, wherein the enumerating step further comprises the step of enumerating the peripheral device as a mass storage device, wherein the peripheral device is not an actual mass storage device.

4. The method as recited in claim 1, further comprising the step of:

accessing a web site using an applet contained within or called by the agent.

5. The method as recited in claim 1, wherein the enumerating step further comprises the step of enumerating the peripheral device as a mass storage device, wherein the peripheral device is not an actual mass storage device.

6. The method as recited in claim 4, further comprising the steps of:

launching an applet from the web site, wherein the applet from the web site is operable for performing operations with respect to the peripheral device.

7. The method as recited in claim 6, wherein the applet from the web site is operable for diagnosing the peripheral device.

8. The method as recited in claim 6, wherein the applet from the web site is operable for enabling, updating, or enhancing functionality of the peripheral device.

9. The method as recited in claim 6, wherein the applet from the web site is operable for maintaining the peripheral device.

10. A data processing system comprising:

a processor;

a memory coupled to the processor by a bus system;

a peripheral device coupled to the processor by the bus system;

circuitry for enumerating the peripheral device as a mock mass storage device, wherein the peripheral device is not an actual mass storage device;

circuitry for selecting the mock mass storage device;

circuitry for executing an executable file contained within the mock mass storage device, which results in a loading of an agent in the memory coupled to the processor; and circuitry for re-enumeration of the peripheral device by the agent so that the peripheral device enumerates as itself.

11. The system as recited in claim 10, wherein the peripheral device is a universal serial bus ("USB") device.

12. The system as recited in claim 10, further comprising:

circuitry for accessing a web site using an applet contained within the agent.

13. The system as recited in claim 12, further comprising:

circuitry for launching an applet from the web site, wherein the applet from the web site is operable for performing operations with respect to peripheral devices coupled to the data processing system.

14. The system as recited in claim 13, wherein the applet from the web site is operable for enabling, diagnosing the peripheral devices.

15. The system as recited in claim 13, wherein the applet from the web site is operable for enabling, updating or enhancing functionality of the peripheral devices.

16. The system as recited in claim 13, wherein the applet from the web site is operable for maintaining the peripheral devices.

17. In a data processing system, a method comprising the steps of:

coupling a peripheral device to a processor;

enumerating the peripheral device as a first enumerated input device, wherein the peripheral device is not actually the input device represented by the enumeration;

selecting the first enumerated input device;

executing an executable file contained within the first enumerated input device, which results in a loading of an agent in memory of the data processing system coupled to the processor; and re-enumeration of the peripheral device by the agent so that the peripheral device enumerates as itself.

* * * * *